(12) United States Patent
Diedrich et al.

(10) Patent No.: US 6,404,531 B1
(45) Date of Patent: Jun. 11, 2002

(54) TRANSVERSE ELECTRO-OPTIC MODULATOR

(75) Inventors: Frank Diedrich, Karlsruhe; Frank Reissmann, Greiz, both of (DE)

(73) Assignee: Gsanger Optoelektronik GmbH & Co. KG, Planegg (DE)

( * ) Notice: Subject to any disclaimer, the term of this patent is extended or adjusted under 35 U.S.C. 154(b) by 0 days.

(21) Appl. No.: 09/673,418

(22) PCT Filed: Apr. 22, 1999

(86) PCT No.: PCT/EP99/02725
§ 371 (c)(1),
(2), (4) Date: Oct. 18, 2000

(87) PCT Pub. No.: WO99/56168
PCT Pub. Date: Nov. 4, 1999

(30) Foreign Application Priority Data

Apr. 23, 1998 (DE) .......................................... 198 18 275
Jun. 5, 1998 (DE) .......................................... 198 20 202

(51) Int. Cl.⁷ .............................. G02F 1/03; G02F 1/00
(52) U.S. Cl. .................... 359/249; 359/321; 359/322
(58) Field of Search ................................. 359/245, 246, 359/249, 250, 254, 321, 322, 323

(56) References Cited

U.S. PATENT DOCUMENTS 1,792,752 A * 2/1931 Michelssen .................. 359/249
2,705,903 A * 4/1955 Marshall ..................... 359/249

OTHER PUBLICATIONS

Biazzo, May 1971, "Fabrication of a Lithium Tantalate Temperature–Stabilized Optical Modulator", Applied Optics, v. 10, No. 5, pp. 1016–1021.*

* cited by examiner

*Primary Examiner*—Georgia Epps
*Assistant Examiner*—David N. Spector
(74) *Attorney, Agent, or Firm*—Antonelli, Terry, Stout & Kraus, LLP

(57) ABSTRACT

The invention relates to a transverse electro-optic modulator for modulating a light beam having a mean wavelength $\lambda$. The transverse electro-optic modulator includes at least one birefringent single-crystal modulator element of a pre-defined length, and controlled by means of an electronic amplifier. The transverse electro-optic modulator further includes a compensator element is made of the same birefringent single-crystal material. The invention is characterized in that for any thickness and a defined length, the thickness of the at least one modulator element is less than both the height and the width of the compensator element.

16 Claims, 1 Drawing Sheet

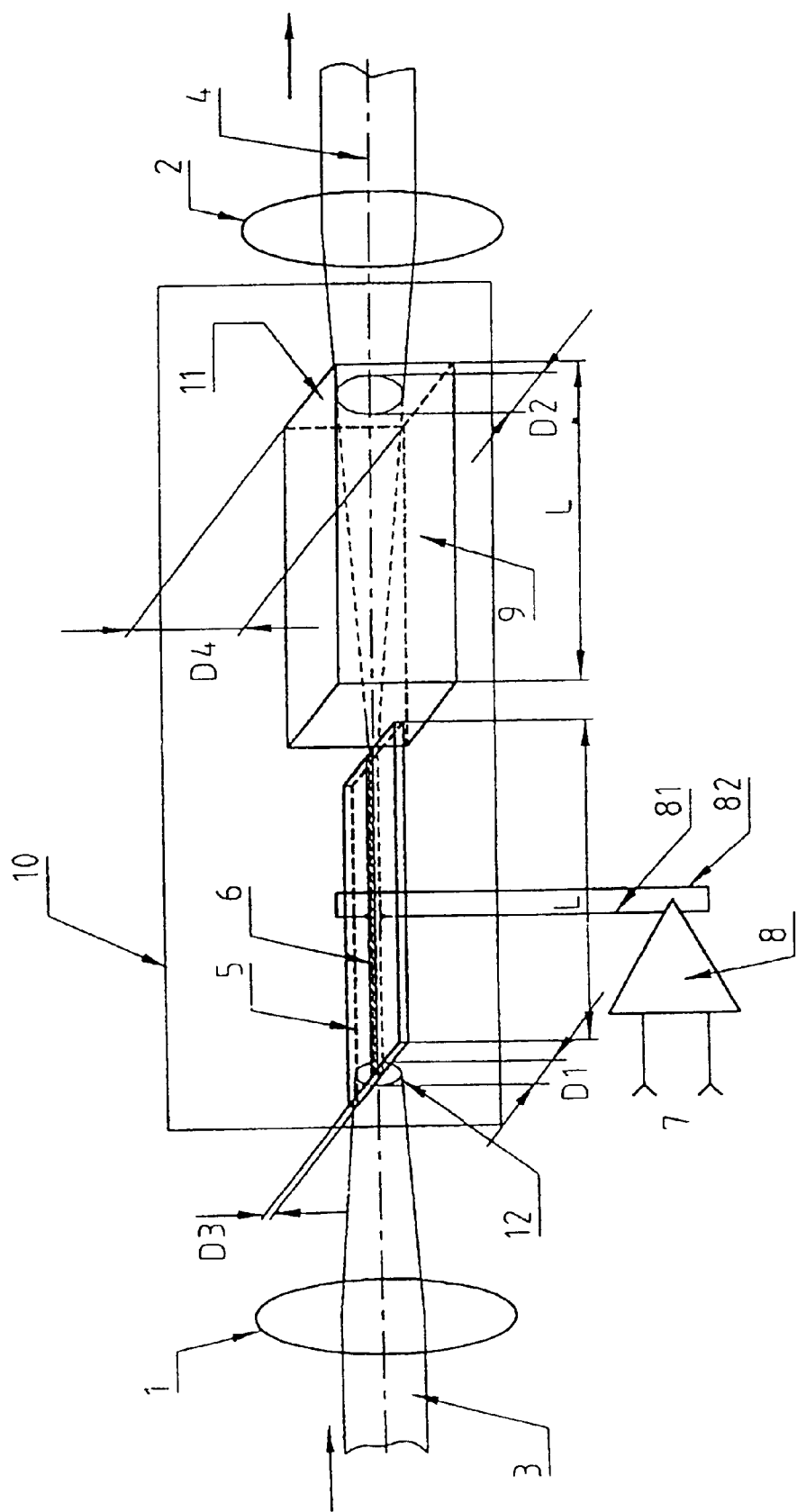

TRANSVERSE ELECTRO-OPTIC MODULATOR

BACKGROUND OF THE INVENTION

The invention relates to a transverse electrooptic modulator (EOM) for modulating the light wave of a laser beam at a specific wavelength lambda according to the preamble of the main claim.

The use of laser radiation sources in television image production is well known (DE-PS 43 06 797).

Also well known is the employment of modulators with birefringence compensation in exposing photosensitive materials such as slide film or reprocessing film. However, it is difficult to produce such a modulator for visible light, particularly green or blue, either small enough or cheaply enough such that it has a modulation width of 100 MHz and permits the use of spectral, not necessarily narrow-band, i.e. inexpensive laser light sources.

SUMMARY OF THE INVENTION

The object of the invention is therefore to create a transverse electrooptic modulator (EOM) for visible light, in particular green and blue, which is of small size and inexpensive to fabricate and which has a modulation width of 100 MHz and permits the use of spectral, not necessarily narrow-band, laser light sources.

For the transverse electrooptic modulator EOM according to the preamble of the main claim, this object is achieved according to the invention through the characterizing features found in the preamble.

The idea according to the invention consists in achieving compensation of the optical birefringence of the modulator element by a single-crystal compensator element of the same material, which element is of considerably larger thickness but of the same length, its width and thickness being selected such that no significant (with respect to the modulator) additional geometrically induced optical losses occur where remaining optical efficiency is at most around 15% for the modulator element when intentionally neglecting a portion of the thickness of the laser beam. This amount is sufficient, however, for the application of exposing photosensitive material where only a high modulation width with simultaneously low cost is obtainable—as permitted by the invention. This is because of the fact that, while radiation sources for laser beams of up to 100 mW power are available, the practical application requires only at most a tenth of this power. The only requirement is that a radiation narrowing of the laser beam fall on or in the vicinity of the modulator element. Preferably, said narrowing lies on the receiving surface of the modulator element. The small thickness of the modulator element results in a low driving voltage of less than 50V, thereby permitting the use of simple-to-produce or commercially available amplifiers having an output voltage of less than 50V, for example, video-output-amplifier chips (hereafter called video chips), of which a single chip drives the modulator element.

Compensation arrangements are, for example, oriented such that the optical path length of the light radiated through the overall arrangement is independent of the state of polarization of the latter.

Additional useful embodiments and further developments of the invention are identified in the subclaims.

BRIEF DESCRIPTION OF THE DRAWINGS

The following explains in more detail one embodiment of the invention with reference to the drawing. In this drawing, FIG. 1 shows a schematic perspective view of the transverse electrooptic modulator together with driving circuits.

DESCRIPTION OF THE PERFERRED EMBODIMENTS

The light wave of laser beam 3 at a specific wavelength is directed to an optical device designed as an optical focusing lens 1. An optical device designed as a collimating lens 2 is located in the direction of propagation behind the transverse electrooptic modulator EOM 10, from which optical device the laser beam designated as 4 emerges.

EOM 10 has two elements arranged in succession, i.e. first in the direction of propagation a modulator element 5, and behind said element a compensation element 9, both of whose single crystals are made of the same material. Only the optical axis of modulator element 5 running perpendicular to direction of propagation 3, 4 is rotated at a right angle, i.e. 90° to the laser beam, vis-à-vis the axis of the compensator element 9 in the plane running perpendicular to the direction of propagation 3, 4. The lengths L of both crystals in the direction of propagation 3, 4 are equal.

Compensation element 9 has a square cross-section with side length D4 such that this length is greater than diameter D2 of the laser beam emerging from exit surface 11 of modulator element 9, with the result that there are no significant additional losses.

Modulator element 5 has a thickness D3, which thickness is smaller than the diameter D1 of the laser beam in the plane of receiving surface 12 of the modulator element.

Apertures to specify diameter D1 of laser beam 3, or to shade the laser beam not passing through but by-passing modulator element 5, may be placed in direction of propagation 3, 4 both in front of modulator element 5 as well as behind said element and in front of compensation element 9.

Additionally, there is provided an electrical amplifier 8 with two inputs 7 whose output lines 81, 82 are connected to electrodes 6 of modulator element 5, as shown schematically in FIG. 1.

Height D3 of modulator element 5 should be smaller than the square root, multiplied by a factor of 2, of the product of the mean wavelength lambda and the length of modulator element 5 or of compensator element 9 divided by pi. The height or width D4 of compensator element 9 assumed to be square in cross section should be greater than two and one half times height D3 of modulator element 5.

What is claimed is:

1. Transverse electrooptic modulator (EOM) for modulating the light wave of a laser beam (3) with mean wavelength lambda, comprising, in a compensation arrangement, at least one modulator element (5) of specified length (L) drivable by an electrical amplifier (8), said modulator element consisting of a certain material itself consisting of a birefringent single crystal, and at least one compensator element (9) of equal length (L) consisting of the same single-crystal material, characterized in that given any width and a specified length (L), the thickness (D3) of at least one modulator element (5) is smaller than both the height as well as width (D4) of compensator element (9).

2. EOM according to claim 1, characterized in that thickness (D3) is smaller by a factor of over 15, preferably over 40, than the height or width (D4) of compensator element (9).

3. EOM according to claim 1, characterized in that the width of modulator element (5) matches the height or width (D4) of compensator element (9).

4. EOM according to claim 1, characterized in that compensator element (9) has a width matching height (D4).

5. EOM according to claim 1, characterized in that height (D4) of compensator element (9) is 2 mm to 4 mm, preferably 3 mm.

6. EOM according to claim 1, characterized in that height (D3) of the modulator element is from 0.2 mm to 0.02 mm, preferably 0.07 mm.

7. EOM according to claim 1, characterized in that height (D3) of modulator element (5) is smaller than the diameter of laser beam (3) in the plane of the receiving surface (12) of modulator element (5), the diameter of a laser beam being defined as the smallest diameter which comprises at least 99% of the radiated power.

8. EOM according to claim 1, characterized by an optical device located in the direction of propagation (3, 4) of the laser beam in front of and behind modulator (10).

9. EOM according to claim 8, characterized in that the optical device located in front of modulator (10) is designed as a focusing lens (1).

10. EOM according to claim 8, characterized in that the optical device located behind modulator (10) is designed as a collimating lens (2).

11. EOM according to claim 1, characterized in that a polarizer device is located in the direction of propagation (3, 4) in front of and behind modulator (10).

12. EOM according to claim 1, characterized in that an aperture device to shape the cross-section of the laser beam is located in front of and behind modulator element (5).

13. EOM according to claim 1, characterized in that modulator element (11) has single crystals consisting of one of the following materials: ADP, AD*P, KDP, KD*P, KTA, RTA, lithium niobate, lithium tantalate, BBO, and potassium niobate.

14. EOM according to claim 1, characterized in that the dimension in the direction of the electrical field of the control signal, i.e. of the thickness of modulator element (11), ranges from 0.025 mm to 0.25 mm, and the electrical capacitance is between 5 pF and 20 pF, and/or the length of the EOM lies between 5 mm and 30 mm.

15. EOM according to claim 1, characterized in that modulator element (11) has a single crystal located on a substrate, which crystal is, at the specified length and thickness, wider than the width of the approximately square cross-section of the electrooptically effective cross-section of modulation.

16. Use of well-known video-output-amplifier chips for television sets as electrical amplifiers for EOMs according to claim 1.

* * * * *